Aug. 9, 1938.  C. E. REED  2,126,034
ROLLER CUTTER SPINDLE AND BEARING ASSEMBLY FOR EARTH BORING DRILLS
Original Filed Oct. 24, 1936
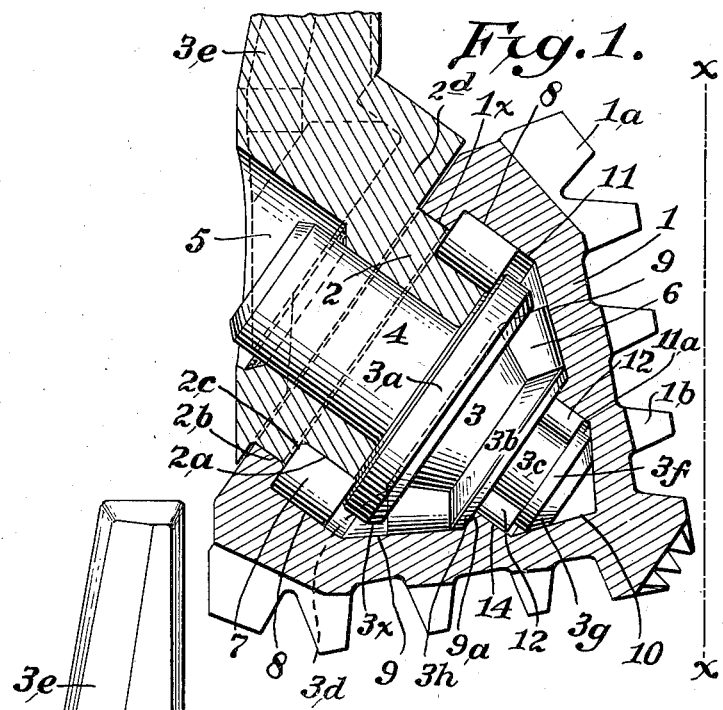
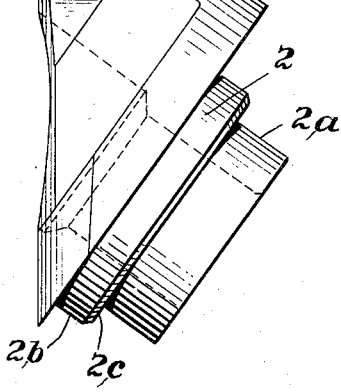
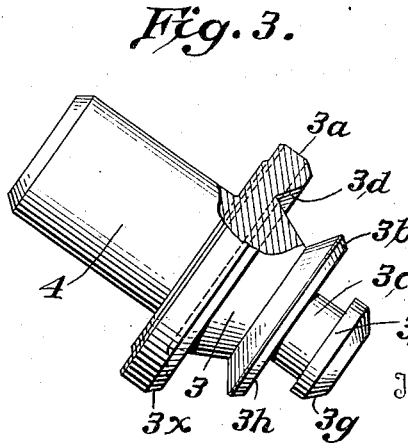
Inventor:
Clarence E. Reed,
By Spear, Donaldson & Hull
Attorneys.

Patented Aug. 9, 1938

2,126,034

UNITED STATES PATENT OFFICE 2,126,034

ROLLER CUTTER SPINDLE AND BEARING ASSEMBLY FOR EARTH BORING DRILLS

Clarence E. Reed, Wichita, Kans., assignor to Chicago Pneumatic Tool Company, New York, N. Y., a corporation of New Jersey Application October 24, 1936, Serial No. 107,470
Renewed June 18, 1938

12 Claims. (Cl. 255—71)

The invention is an improvement upon the general form of earth boring bits employing frusto-conical anti-friction roller bearings, such, for instance, as that illustrated in an application for patent of the United States filed by me, Serial No. 28,329, June 25, 1935, now Patent No. 2,075,997, granted April 6, 1937.

The invention consists in the features and combination and arrangement of parts disclosed herein and particularly pointed out in the appended claims.

In the drawing—

Figure 1 is a central vertical sectional view of the cutter with the spindle and roller bearing organization shown partly in side elevation and partly in section.

Fig. 2 is a side view of the main part of the spindle and its support.

Fig. 3 is a side view of the removable terminal section of the spindle, partly in section.

Referring to Figure 1, the roller cutter 1 is of frusto-conical form, having a toothed base cutting zone 1a and a toothed frusto-conical cutting zone 1b.

These two zones are at an inclination to each other. The teeth of the base zone are comparatively wide and extend in planes radially from the axis of the cutter. The teeth of the frusto-conical zone are arranged in widely spaced apart circumferential rows. The cutter is in one piece.

The spindle comprises a main portion 2 and a terminal portion 3. The main portion is integrally connected with its base or support, which has a shank 3e extending upwardly to fit into a recess in the bit head, wherein it is suitably secured, as, for instance, by welding. In the form of the invention illustrated, the support for the spindle may be regarded as the body portion 2d located between the spindle proper and the shank 3e, which body portion is adapted to fit within a recess in the bit head. The terminal portion of the spindle is composed of the body portion 3, of frusto-conical form, tapering towards the apex end of the rotary cutter, a circumferential flange 3a at the base of and of larger diameter than said body portion, a flange 3b at the apex portion of said frusto-conical body, a cylindrical extension 3c of reduced diameter in respect to the diameter of the small end of the frusto-conical body, and a flange 3f having a friction bearing face 3g tapering to the free end of the spindle.

The terminal portion of the spindle has a stem 4 of cylindrical form extending from the base flange 3a through a bore in the main part 2 of the spindle, and having its tapered end located in a recess 5 of the spindle support, wherein said end is welded in place to hold the terminal part of the spindle in place with the face of the base flange 3a fitting against the end face of the main spindle portion 2. The flange 3a has a beveled outer face 3x. The main part 3 of the terminal spindle section provides a raceway bounded by the spaced apart flanges 3a and 3b upon which the anti-friction rollers 6 are adapted to run, said rollers being of frusto-conical form with their larger base ends adjacent the flange 3a. These larger diameter or base ends of these frusto-conical anti-friction rollers bear upon the flange 3a at the larger diameter or base end of the frusto-conical body portion 3 of the terminal section of the spindle, and for receiving the large ends of these anti-friction rollers, the face of the flange is undercut at 3d, as indicated in dotted lines.

The main portion 2 of the spindle at its end is of reduced diameter, as indicated at 2a, in respect to its portion 2b adjacent the spindle support, and this end is of cylindrical form and provides the bottom of a raceway for anti-friction rollers 7. The face of the flange 3a of the terminal section of the spindle forms one side of this raceway, and the shoulder 2c formed by the face of the main spindle portion 2b of full diameter forms the other side wall of this runway. The flange 3a is of larger diameter than the main portion 2a of the spindle, and of the body of the terminal section of this spindle, and thus provides one defining wall of each of the raceways for the anti-friction rollers 6 as well as for the anti-friction rollers 7.

Cylindrical anti-friction rollers 12 are mounted on the cylindrical small diameter extension 3c of the terminal section 3 of the spindle, it being noted that this cylindrical extension forms the bottom wall of a raceway defined on one side by the inner face of the flange 3b and at the other side by the outer face of the terminal flange 3f. The opposing faces of the flanges 3b and 3f are parallel to each other and lie in planes at right angles to the axis of the spindles, so that they will be engaged by the flat end faces of the small cylindrical anti-friction rollers 12.

The frusto-conical cutter has a bore conforming generally to the configuration of the spindle and anti-friction members above described. That is to say, it has a bore tapering generally towards the free end of the spindle which it encloses, said bore being made up of a large diameter cylindrical portion 1x within the base of the cutter having a groove 8 in its wall substantially complementary to the raceway 2a of the spindle, said cutter raceway receiving the rollers 7; next, a frusto-conical bore portion 9 complementary to the surface of the frusto-conical body 3 of the terminal section of the spindle, thereby providing a raceway portion for the frusto-conical rollers 6; next, a shoulder 9a, the face of which is in a plane at right angles to the axis of the spindle and having frictional contact with the face 3h of the flange 3b; next, a cylindrical bore portion 14 serving as a raceway for the cylindrical anti-friction rollers 12.

The flange 3b serves the triple purpose of providing one of the walls defining the frusto-conical raceway, one of the walls for defining the raceway of the cylindrical rollers 12, and a friction surface for receiving end thrust of the roller cutter outwardly, and finally in order, towards the free end of the assembly the bore of the cutter has a conical bore, the wall 10 of which is complementary to the conical free end face of the terminal section of the spindle for frictional engagement therewith.

In assembling the organization, the terminal section of the spindle is placed first in the roller cutter with its free end resting upon the wall 10 of the bore of the cutter, it being understood that the frusto-conical rollers 6 and the small cylindrical rollers 12 first have been placed in their respective raceways of the spindle, so that the terminal section of the spindle carrying these anti-friction rollers properly seated therein are placed in position as one body. Next the rollers 7 are placed in the raceway of the cutter. This readily can be done, because the annular space between the stem 4 and the wall of the cutter bore is of sufficient width to allow the rollers 7 to be moved first endwise in this space, and then laterally into the raceway portion 8. The main section of the spindle is now moved axially along the stem 4 into the position shown in the drawing, and then the projecting end of the stem is welded in the recess 5.

The vertical axis of the drill is indicated by the dotted line x—x. The turning of the bit head carries the organization about this vertical axis causing the frusto-conical cutter to roll upon the bottom of the bore hole in the position indicated in the drawing, so that the teeth will cut the formation, and the form of the cut will be substantially that of the general outline of the toothed surfaces of the cutter as illustrated. The thrusts upon the cutter are upward and outward in respect to the vertical axis of the drill. End thrusts of the cutter outwardly from the drill axis towards the spindle support are taken by the contacting friction surfaces between the free end of the spindle and the wall of the bore of the cutter within its apex; also by the face of shoulder 9a engaging the face 3h of the flange 3b; also by the conical anti-friction rollers, these end thrusts on the said rollers being transmitted into the conical body portion 3 of the terminal spindle section, the flange 3a, and thence to the main spindle section, and its support. Upthrusts will also be sustained by the surfaces and anti-friction rollers, and thrusts imposed in a direction radial to the axis of the cutter will also be sustained by the frusto-conical rollers and in part substantially by the beveled free end of the terminal section of the spindle. Upthrusts and thrusts imposed radially of the axis of the roller cutter will be sustained by the cylindrical rollers. End thrust of the cutter outwardly towards the spindle support will not be imposed on the ends of the cylindrical rollers 7 because of the space at 11 between the wall of the raceway and the end face of the rollers, which space will prevent these rollers from being in shear relation to the roller cutter. The space 11a will prevent end thrust of the cutter from being imposed upon the inner end faces of the small cylindrical rollers 12. The cylindrical rollers will take some of the upthrust imposed on the roller cutters, and particularly the radial thrusts, from the cutting zone 1a.

The rollers 7 will lock the roller cutter on the spindle rotatively.

The small anti-friction cylindrical rollers 12 serve in maintaining alignment between the cutter and the spindle, and as a result the frusto-conical rollers will be relieved of thrusts which otherwise would be imposed thereon due to misalignment. The conical rollers in turn will take upon their peripheries the end thrust of the roller cutter outwardly towards the spindle support and transmit the same to the spindle, and therefore outward end thrust of the cutter upon both sets of cylindrical rollers through contact with their peripheries will be prevented, which end thrust would otherwise tend to create misalignment of both sets of cylindrical rollers in relation to the spindle axis by reason of forcing the outer end faces of the cylindrical rollers against the shoulder or flange defining the outer side of the raceways in which said cylindrical rollers work. The net result in service is to increase the efficient useful life of the assembly by a number of hours.

I claim:

1. As an article of manufacture, a spindle and support for an earth boring drill comprising a spindle main body having a cylindrical raceway thereon for receiving radial thrusts of a roller cutter transmitted through roller bearings, a terminal spindle section removably secured to said main body having a flange abutting the end of the main body and defining one side of the cylindrical raceway, said terminal section also having a frusto-conical raceway portion coaxially with the main body, and extending from said flange, a flange at the smaller diameter end of said frusto-conical portion, a reduced diameter cylindrical extension providing a third raceway beyond said second mentioned flange, and a third flange at the end of said last mentioned extension providing, together with said reduced diameter extension and said second flange, a raceway for cylindrical roller bearings, substantially as described.

2. As an article of manufacture, a spindle and support for an earth boring drill comprising a spindle projecting from the support with one end free, said spindle having adjacent the support a cylindrical raceway for receiving radial thrusts of a roller cutter transmitted through cylindrical roller bearings, said spindle having at its free end a reduced diameter cylindrical extension providing an annular shoulder and a raceway surface between the same and the spindle's free end for receiving cylindrical roller bearings, said spindle having at a zone between the cylindrical raceway first mentioned and the reduced diameter extension, a frusto-conical raceway for frusto-conical roller bearings with a shoulder at each end of said frusto-conical raceway positioning said frusto-conical roller bearings for sustaining on their peripheries end thrust of the roller cutter outwardly towards the support, and thereby relieving both sets of cylindrical roller bearings of end thrust of said roller cutter outwardly towards the support.

3. A roller cutter and bearing assembly for earth boring drills comprising a support, a spindle projecting from said support having a cylindrical portion near the support, a frusto-conical portion located at a zone intermediate the cylindrical portion and the free end of the spindle, a frusto-conical cutter having a bore with surfaces complementary to the said cylindrical and frusto-conical portions of the spindle, said spindle having an annular shoulder at the larger end of its frusto-conical portion, cylindrical roller bearings between the said complementary cylindrical surfaces of the spindle and cutter arranged on axes parallel with the axes of the spindle and cutter, and taking radial loads of the cutter, and frusto-conical rollers between the complementary frusto-conical surfaces of the spindle and cutter, with their larger end faces engaging said shoulder on the spindle, said spindle having a reduced diameter cylindrical extension at its apex providing a shoulder and a raceway surface, cylindrical roller bearings on said reduced diameter raceway surface with their outer end faces adjacent said last mentioned shoulder, said roller cutter having a cylindrical raceway for said cylindrical rollers, said frusto-conical rollers taking radial loads and also end thrust of the roller cutter towards the spindle support, thereby relieving both sets of cylindrical roller bearings of end thrust, substantially as described.

4. A roller cutter and roller bearing assembly for earth boring drills comprising a support having a spindle projecting therefrom and provided with a cylindrical extension at its free end furnishing a cylindrical raceway surface, and having at a zone intermediate said extension and the spindle support a frusto-conical portion providing a raceway defined by a shoulder at both the larger and smaller diameter ends of said frusto-conical portion, said spindle having an annular shoulder from which the cylindrical extension projects, a roller cutter having raceways in its bore complementary to the cylindrical and frusto-conical raceways, cylindrical roller bearings on said cylindrical extension receiving radial loads from the cutter, and frusto-conical roller bearings on the frusto-conical portion of the spindle receiving radial loads and taking on their peripheries end thrust of the cutter towards the spindle support, and relieving the cylindrical bearing rollers of end thrust towards the support.

5. As an article of manufacture, a spindle and support for an earth boring drill comprising a spindle projecting from the support, said spindle having adjacent the support a cylindrical raceway for receiving radial thrusts of a roller cutter transmitted through cylindrical roller bearings, said spindle having a reduced diameter cylindrical portion providing an annular shoulder and a raceway surface between the same and one end of the spindle for receiving cylindrical roller bearings, said spindle having at a zone between the cylindrical raceway first mentioned and the reduced diameter portion, a frusto-conical raceway for frusto-conical roller bearings with a shoulder at each end of said frusto-conical raceway positioning said frusto-conical roller bearings for sustaining on their peripheries end thrust of the roller cutter towards the support, and thereby relieving both sets of cylindrical roller bearings of end thrust of said roller cutter towards the support.

6. As an article of manufacture, a spindle for an earth boring drill having a cylindrical raceway for receiving radial thrusts of a roller cutter transmitted through cylindrical roller bearings, said spindle having a reduced diameter cylindrical portion providing an annular shoulder and a raceway surface between the same and one end of the spindle for receiving cylindrical roller bearings, said spindle having at a zone between the cylindrical raceway first mentioned and the reduced diameter portion, a frusto-conical raceway for frusto-conical roller bearings with a shoulder at each end of said frusto-conical raceway positioning said frusto-conical roller bearings for sustaining on their peripheries end thrust of the roller cutter, and thereby relieving both sets of cylindrical roller bearings of end thrust of said roller cutter.

7. A roller cutter, spindle and roller bearing assembly for earth boring drills comprising a roller cutter, a spindle having a cylindrical raceway, cylindrical roller bearings on said raceway taking radial thrusts of the roller cutter, said spindle having a reduced diameter cylindrical portion providing an annular shoulder and a raceway surface between the same and one end of the spindle, cylindrical roller bearings on the raceway of said reduced diameter cylindrical spindle portion receiving radial thrusts of said roller cutter, said spindle having at a zone between the cylindrical raceway first mentioned and the reduced diameter portion a frusto-conical raceway with a shoulder at each end of said frusto-conical raceway, frusto-conical roller bearings on said frusto-conical raceway positioned by said shoulders, said frusto-conical roller bearings sustaining on their peripheries end thrust of the roller cutter, and thereby relieving both sets of cylindrical roller bearings of end thrust of said roller cutter.

8. A roller cutter and roller bearing assembly for earth boring drills comprising a support having a spindle projecting therefrom, said spindle having a frusto conical portion tapered toward the free end of the spindle and providing a raceway defined by a shoulder at both the larger and smaller diameter ends of said frusto conical portion, frusto conical rollers in said raceway, said spindle having a cylindrical extension providing a cylindrical raceway between said frusto conical portion and the free end of the spindle, cylindrical rollers in said cylindrical raceway, said spindle having a raceway between said frusto conical portion and the support, rolling bearings in said last-mentioned raceway, a cutter enclosing said spindle and having complementary raceways for said frusto conical rollers, cylindrical rollers and rolling bearings respectively.

9. A roller cutter and roller bearing assembly for earth boring drills according to claim 8 in which said cutter has an inwardly extending flange adjacent said support engaging said rolling bearings to lock the cutter to the spindle.

10. A roller cutter, spindle and roller bearing assembly for earth boring drills comprising a roller cutter, a spindle having a plurality of cylindrical raceways and a frusto-conical raceway between said cylindrical raceways, cylindrical roller bearings between said cylindrical raceways of the spindle and complementary raceways of the cutter and frusto-conical roller bearings between the frusto-conical raceway of the spindle and a complementary frusto-conical raceway of the cutter, said frusto-conical roller bearings taking radial loads and end thrust of the cutter upon their peripheries and thereby relieving said sets of cylindrical roller bearings of end thrust of the cutter upon their peripheries.

11. An earth boring drill having a bit head and roller cutter units, said roller cutter units including a spindle, said spindle having three roller bearing raceways thereon, one of which raceways is frusto-conical, and roller bearings on said raceways.

12. In an earth boring drill, a roller cutter unit comprising a roller cutter, a spindle having roller bearing raceways, one of which raceways is of frusto-conical form and positioned between two cylindrical raceways, and roller bearings on said raceways and within the bore of said roller cutter.

CLARENCE E. REED.